United States Patent
Yanagida et al.

(10) Patent No.: US 9,575,511 B2
(45) Date of Patent: Feb. 21, 2017

(54) DOCKING UNIT

(71) Applicant: Kabushiki Kaisha Toshiba, Minato-ku, Tokyo (JP)

(72) Inventors: Atsuhiro Yanagida, Tokyo (JP); Tomomi Murayama, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/053,785

(22) Filed: Feb. 25, 2016

(65) Prior Publication Data

US 2017/0023974 A1 Jan. 26, 2017

(30) Foreign Application Priority Data

Jul. 24, 2015 (JP) .................................. 2015-146471

(51) Int. Cl.
*G06F 1/16* (2006.01)
(52) U.S. Cl.
CPC .................................. *G06F 1/1632* (2013.01)
(58) Field of Classification Search
CPC .................................................... G06F 1/1632
See application file for complete search history.

(56) References Cited

U.S. PATENT DOCUMENTS

| | | | | |
|---|---|---|---|---|
| 5,292,267 A * | 3/1994 | Kobayashi | ............ | G06F 1/1632 439/247 |
| 6,353,536 B1 * | 3/2002 | Nakamura | ................ | G06F 1/20 361/679.41 |
| 6,682,040 B1 * | 1/2004 | MacEachern | .......... | F16M 11/10 248/349.1 |
| 7,333,325 B2 * | 2/2008 | DeLuga | ................ | G06F 1/1632 361/679.55 |
| 7,580,255 B2 * | 8/2009 | Crooijmans | .......... | G06F 1/1632 361/679.41 |
| 8,653,791 B2 * | 2/2014 | Yoneyama | ............ | H02J 7/0044 320/115 |
| 8,721,356 B2 * | 5/2014 | Webb | .................... | G06F 1/1632 439/248 |
| 8,824,135 B2 * | 9/2014 | Tachibana | ............. | G06F 1/1632 345/169 |
| 8,915,558 B2 * | 12/2014 | Sween | .................... | G06F 1/203 248/176.1 |

(Continued)

FOREIGN PATENT DOCUMENTS

| | | |
|---|---|---|
| JP | 2000-089850 A | 3/2000 |
| JP | 2010-250699 A | 11/2010 |
| JP | 2014-228928 A | 12/2014 |

*Primary Examiner* — Anthony Q Edwards
(74) *Attorney, Agent, or Firm* — Knobbe, Martens, Olson & Bear LLP

(57) ABSTRACT

According to one embodiment, a docking unit includes a placement surface which slopes down to a front side of the docking unit and configured to receive an electronic device, a docking connector on the placement surface and configured to connect to an extended connector of the electronic device, a groove portion recessed under the placement surface and located behind the docking connector, a biasing member detachably fitted into the groove portion, and a pressing member on a top surface of the biasing member configured to protrude upward from the top surface and to retract downward into the top surface by first resilience.

9 Claims, 11 Drawing Sheets

(56) References Cited

U.S. PATENT DOCUMENTS

| | | | |
|---|---|---|---|
| 9,038,544 B2 * | 5/2015 | Coffin | A47B 23/002 108/7 |
| 2003/0148740 A1 * | 8/2003 | Yau | H04M 1/04 455/575.1 |
| 2006/0250764 A1 * | 11/2006 | Howarth | G06F 1/1632 361/679.41 |
| 2009/0009957 A1 * | 1/2009 | Crooijmans | G06F 1/1632 361/679.41 |
| 2010/0265652 A1 | 10/2010 | Agata et al. | |

* cited by examiner

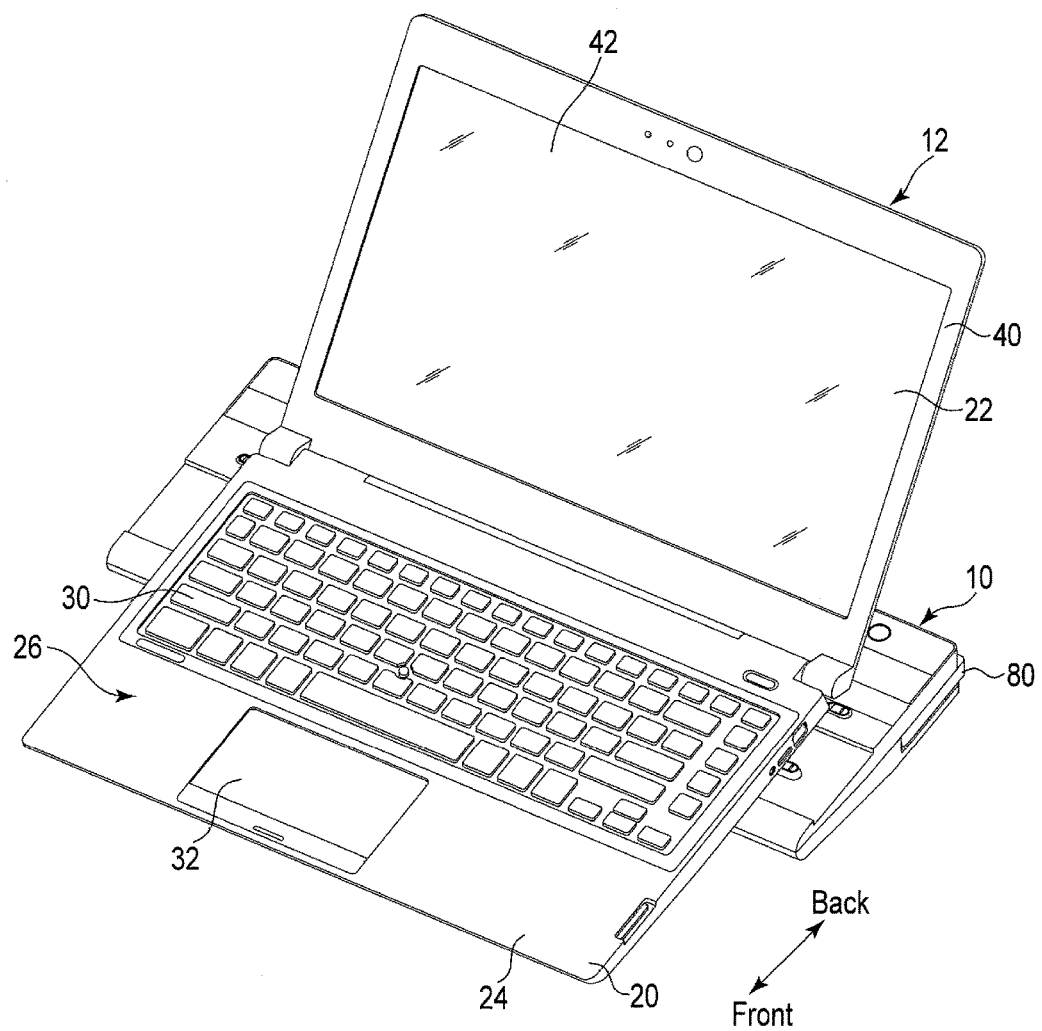
F I G. 1

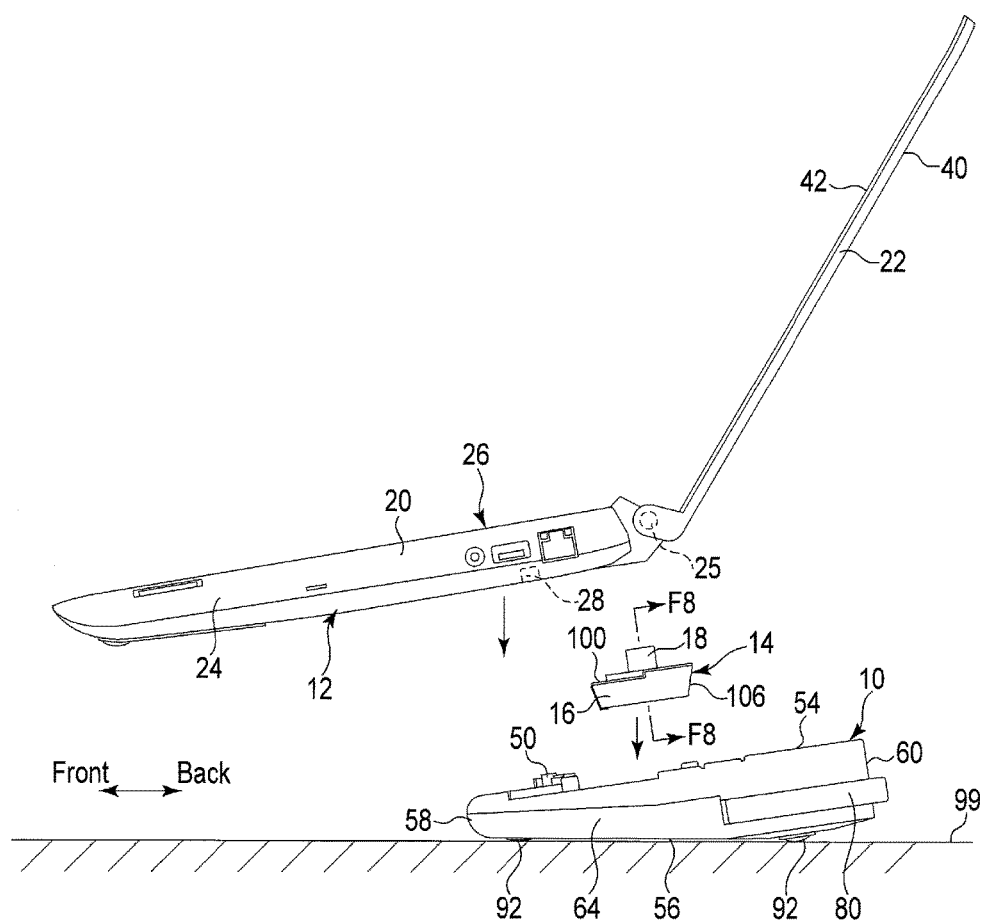
F I G. 2

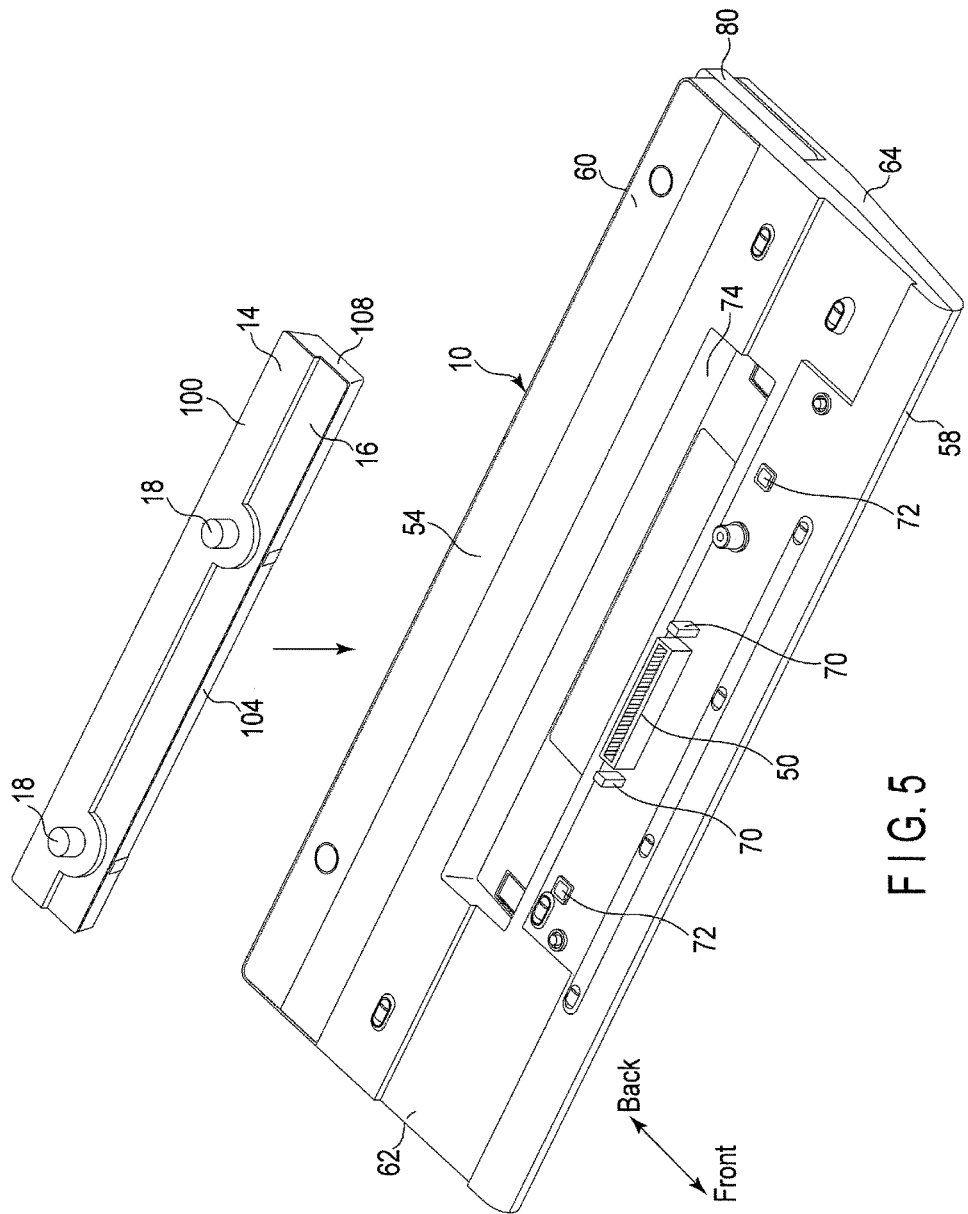
F I G. 5

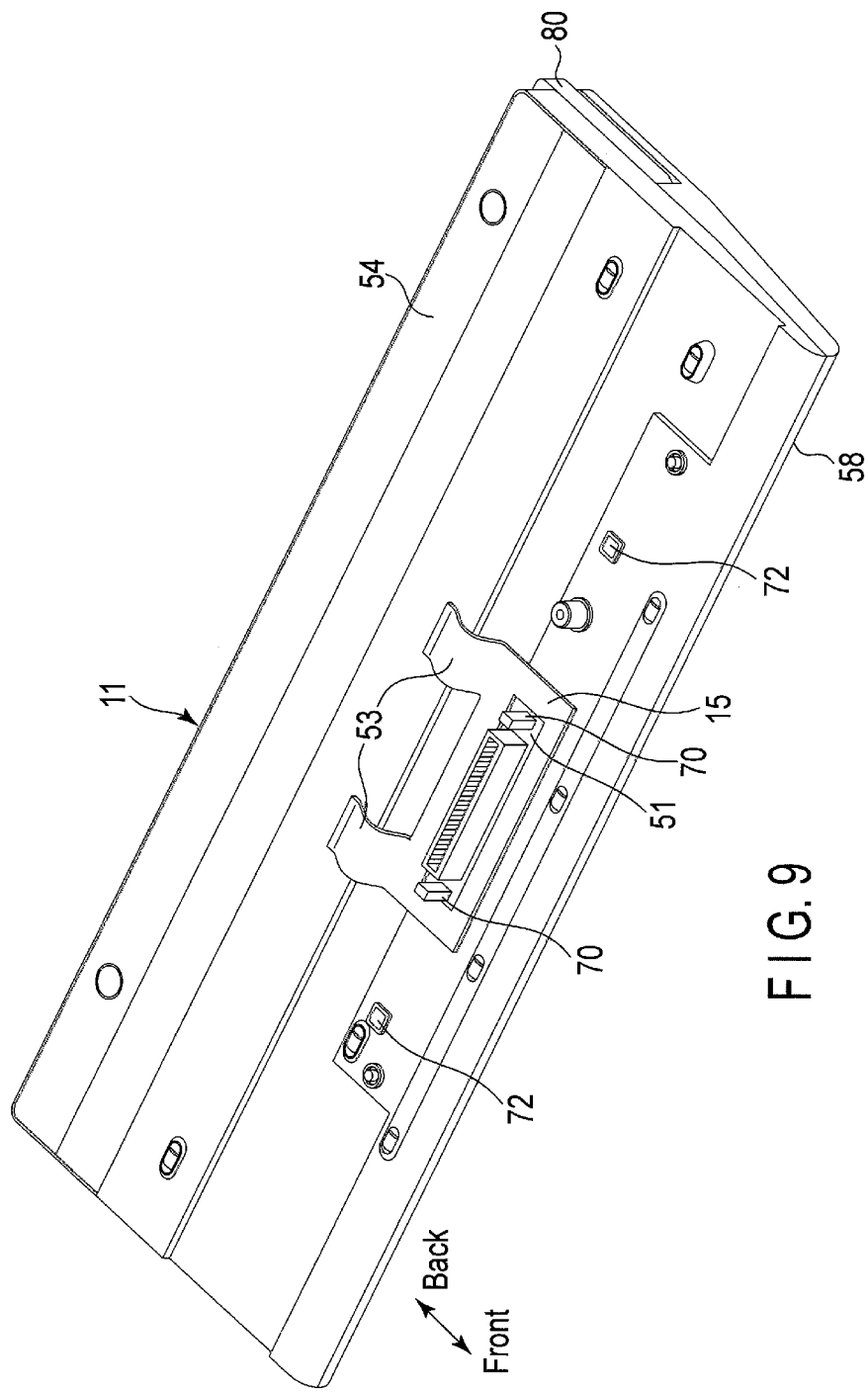
F I G. 9

DOCKING UNIT

CROSS-REFERENCE TO RELATED APPLICATIONS

This application is based upon and claims the benefit of priority from Japanese Patent Application No. 2015-146471, filed Jul. 24, 2015, the entire contents of which are incorporated herein by reference.

FIELD

Embodiments described herein relate generally to a docking unit to which an electronic device is attached.

BACKGROUND

A docking unit is a unit to which an electronic device such as a personal computer is docked in order to expand the functions of the electronic device.

In a personal computer constituted by a main unit and an image display unit on the back end of the main unit, the front end of the main unit is often lifted from the desk when the personal computer is docked to the docking unit, depending on the weight relationship between the image display unit and the main unit.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 1 is a perspective view showing a state where a personal computer is attached to a docking unit of the first embodiment.

FIG. 2 is an exploded side view of the docking unit and the personal computer.

FIG. 5 is an exploded perspective view of the docking unit.

FIG. 9 is a perspective view of a docking unit of the second embodiment.

DETAILED DESCRIPTION

Various embodiments will be described hereinafter with reference to the accompanying drawings.

Figure 3:
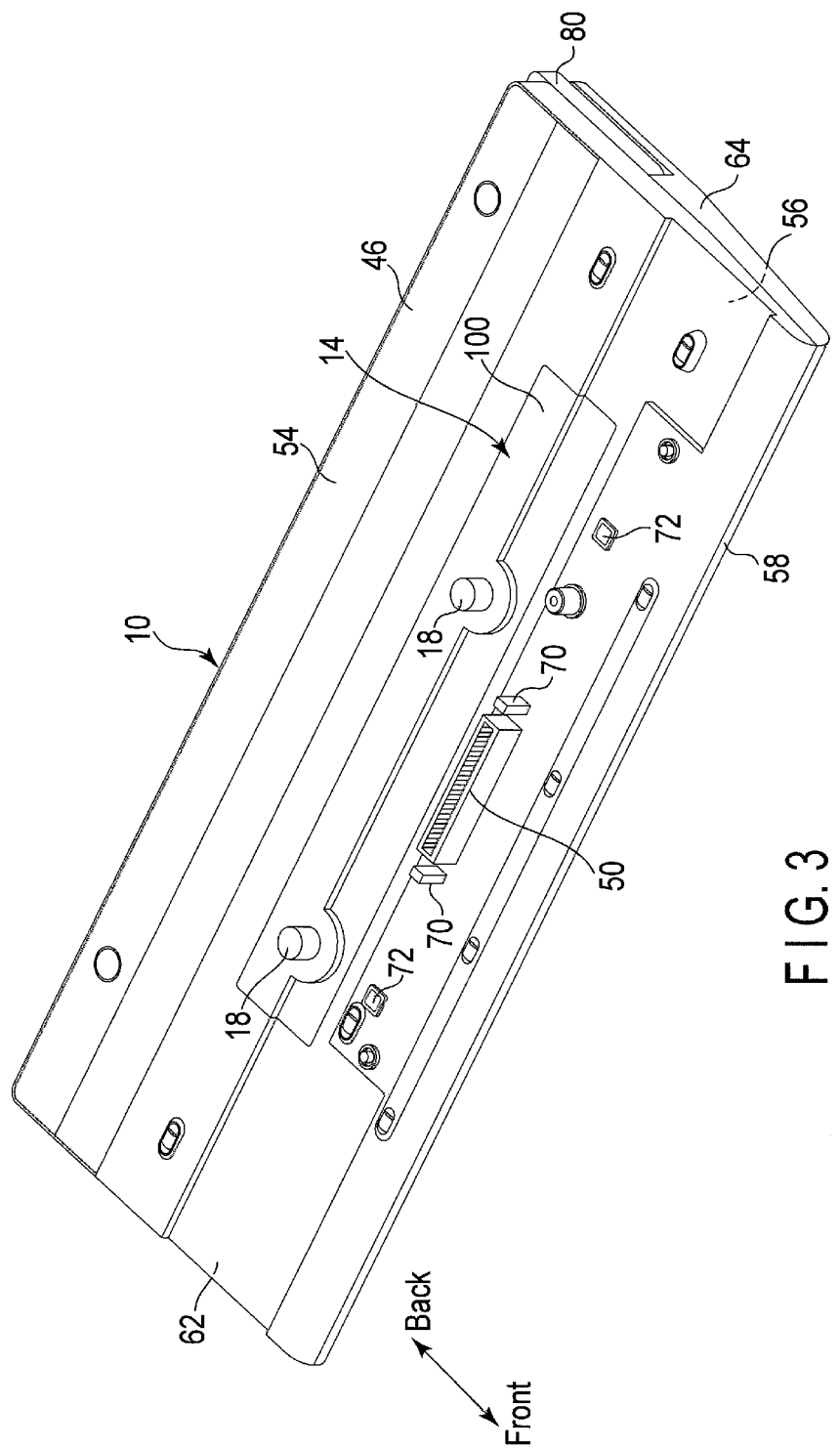
FIG. 3 is a perspective view of the docking unit.

In general, according to one embodiment, a docking unit of the first embodiment is described with reference to the drawings. FIG. 1 is a perspective view showing a state where a personal computer 12, which is an example of an electronic device, is attached to a docking unit 10. FIG. 2 is a side view showing a state where the personal computer 12 is separated from the docking unit 10. FIG. 3 is a perspective view of the docking unit 10.

The docking unit 10 and the personal computer 12 are hereinafter described on the assumption that the user's side is the front side of the docking unit 10 and the personal computer 12, the opposite side is the rear or back side, the direction of gravitational force is downward and the opposite direction is upward in a state where the personal computer 12 is used by the user (FIG. 1).

The personal computer 12 is described. As shown in FIG. 1, the personal computer 12 comprises a main unit 20 and a display unit 22. The main unit 20 comprises a housing 24, a circuit board, etc., provided inside the housing 24, an input unit 26 and an extended connector 28 (FIG. 2).

The housing 24 has a flat and substantially rectangular shape. The input unit 26 includes a keyboard 30, a touchpanel 32, etc., and is provided on the top surface of the housing 24. The keyboard 30, the touchpanel 32, etc., are electrically connected to the circuit board, etc., inside the housing 24.

As shown in FIG. 2, the extended connector 28 is provided on the bottom surface of the housing 24. A connection port of the extended connector 28 is opened downward from the bottom surface of the main unit 20. The extended connector 28 may be equipped with an openable cover. The extended connector 28 is electrically connected to the circuit board, etc.

The display unit 22 comprises a housing 40 and a display panel 42. The display panel 42 is, for example, a liquid crystal display panel, and is provided inside the housing 40 with its image display surface facing to the front side. The display unit 22 is rotatably attached to the main unit 20 by hinges 25 connecting an end of the housing 40 of the display unit 22 and the back end of the housing 24 of the main unit 20.

Figure 6:
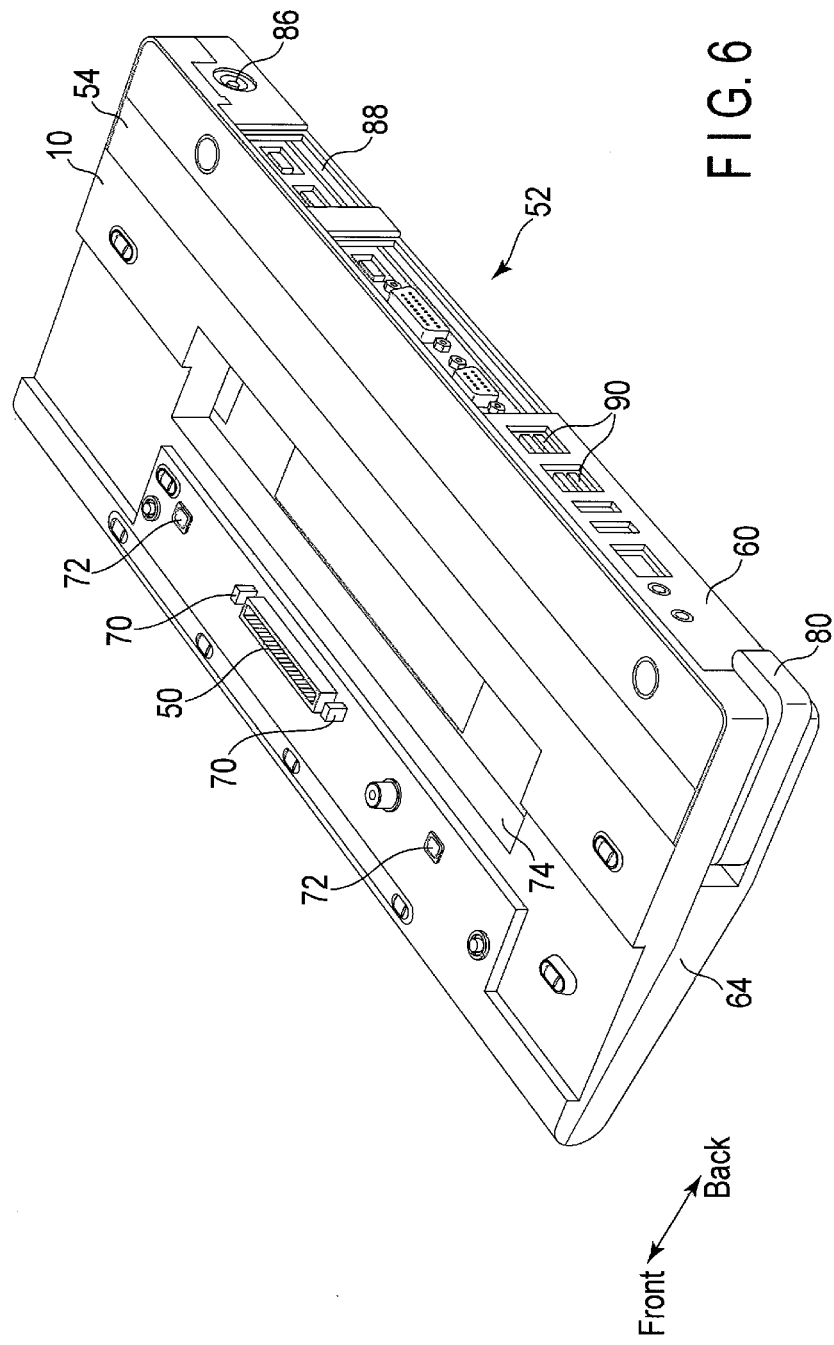
FIG. 6 is a perspective view of the docking unit from the back side.

The docking unit 10 is described. As shown in FIG. 3, the docking unit 10 comprises a housing 46, a circuit board provided inside the housing 46, a docking connector 50 and various connection terminals 52 (FIG. 6).

The housing 46 comprises a top plate 54, a bottom plate 56, a front plate 58, a back plate 60, a right side plate 62, a left side plate 64 and space surrounded by these plates. A removal mechanism and the circuit board having a processing circuit are provided inside the housing 46.

Figure 4:
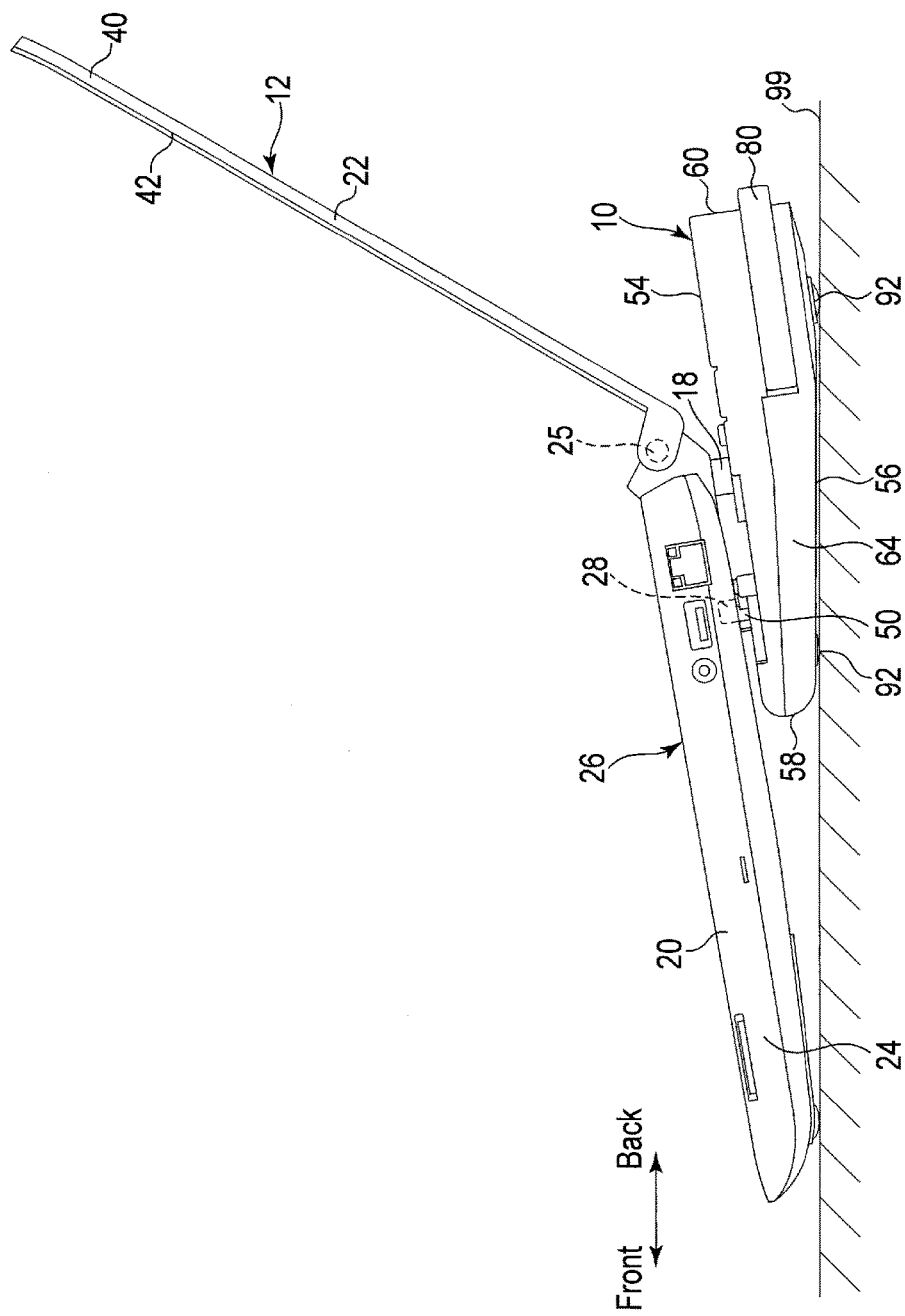
FIG. 4 is a side view showing a state where the personal computer is attached to the docking unit.

The top plate 54 forms a placement surface in the claims, and slopes such that the front side of the housing 46 is low when used on the desk 99 as shown in FIG. 4. Accordingly, the entire docking unit 10 is formed into a trapezoidal shape having a sloping top surface. The slope of the top plate 54 is set such that the input unit 26 is at an angle suitable for performing input operation to the input unit 26 when the personal computer 12 is docked to the docking unit 10.

The docking connector 50, locking members 70, push up pins 72 and a groove portion 74 are provided on the top plate 54. The docking connector 50 is opened upward from the top plate 54. The docking connector 50 corresponds to the extended connector 28 of the personal computer 12. The docking connector 50 is electrically connected to the circuit board of the docking unit 10.

The end (upper end) of each locking member 70 is bent into an L shape and can tilt in the direction of bend. The end of each locking member 70 engages with an engagement portion of the personal computer 12. The locking members 70 are connected to the removal mechanism provided inside the docking unit 10.

The push up pins 72 are provided so as to protrude from and retract into the top plate 54. The push up pins 72 are usually kept in a state where the top surfaces of the push up pins 72 do not protrude from the top surface of the top plate 54. The push up pins 72 are connected to the removal mechanism.

The groove portion 74 is located behind the docking connector 50 in a state of using the docking unit 10. The groove portion 74 has a shape in which a high-capacity battery pack attached to the personal computer 12 is set when the personal computer 12 is docked to the docking unit 10. The groove portion 74 may be formed for a purpose other than storing the high-capacity battery.

A release lever 80 is provided on the left side plate 64 of the housing 46 (i.e., on the right side as seen from the front of the housing 46). The release lever 80 is rotatably attached to the housing 46. The release lever 80 is connected to the removal mechanism provided inside the docking unit 10, and the removal mechanism is connected to the locking members 70 and the push up pins 72. When the release lever 80 is rotated, the locking members 70 return from the lock direction and the push up pins 72 protrude from the top surface of the top plate 54.

As shown in FIG. 6, the connection terminals 52 are provided on the back surface of the housing 46. For example, the connection terminals 52 include a power connector 86, various input and output terminals 88, USB connectors 90 and the like. Protruding portions 92 (FIG. 2) are provided on the bottom surface of the housing 46 as mounting feet.

When the extended connector 28 and the docking connector 50 are connected, the circuit board of the personal computer 12 and the circuit board of the docking unit 10 are connected and the functions of the personal computer 12 are expanded by the docking unit 10.

Figure 7:
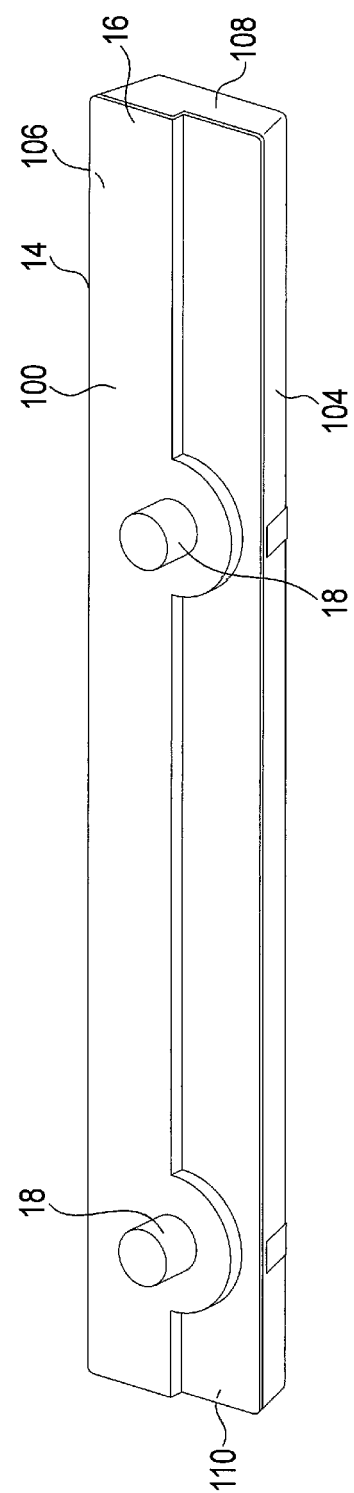
FIG. 7 is a perspective view of a biasing member.
Figure 8:
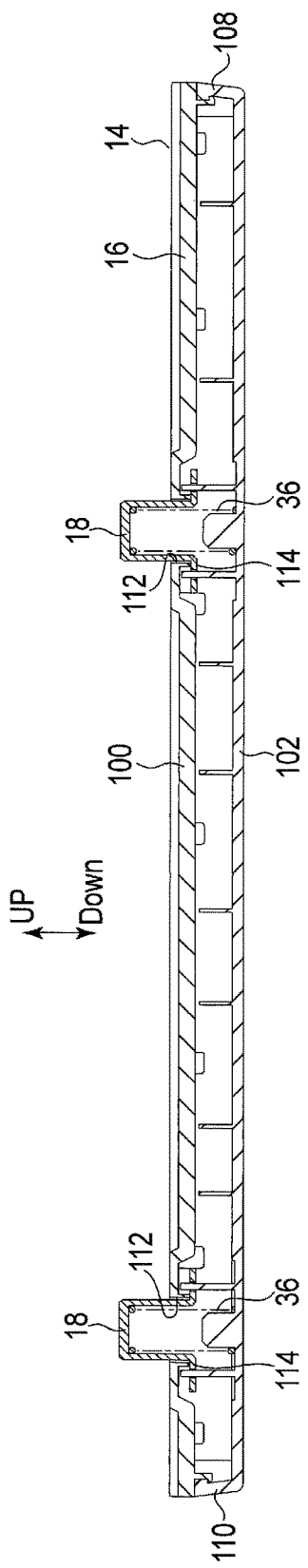
FIG. 8 is a cross-sectional view of the biasing member seen along a plane including line F8-F8 of FIG. 2.

Next, a biasing member 14 set in the groove portion 74 is described. As shown in FIG. 5, FIG. 7 and FIG. 8, the biasing member 14 comprises a housing 16, pressing members 18 and springs 36. The housing 16 comprises a top plate 100, a bottom plate 102, a front plate 104, a back plate 106, a left side plate 108 and a right side plate 110, and is substantially formed into a rectangular parallelepiped having space inside.

The housing 16 has an external shape corresponding to the shape of the groove portion 74. The biasing member 14 engages with the groove portion 74 almost without play, and the top plate 100 of the biasing member 14 and the top plate 54 of the docking unit 10 are substantially in the same plane.

Circular mounting holes 112 corresponding to the pressing members 18 are provided on the top plate 100 of the housing 16. The mounting holes 112 are provided on the top plate 100 asymmetrically with respect to the longitudinal center of the top plate 100.

Each pressing member 18 has a shape of a covered cylinder and comprises an edge portion 114 spreading peripherally at the lower end. The cylindrical portion of each pressing member 18 has a diameter so as to pass through the mounting hole 112 provided on the top plate 100. The edge portion 114 of each pressing member 18 has a size so as to be caught by the edge of the mounting hole 112 without passing through the mounting hole 112.

The springs 36 are provided inside the pressing members 18. The springs 36 are provided between the bottom plate 102 of the housing 16 and the pressing members 18 and bias the pressing members 18 to protrude upward from the top plate 100. The springs 36 have sufficient force to allow the pressing members 18 to touch the bottom surface of the personal computer 12 and push up the personal computer 12 such that the front side of the personal computer 12 is moved down with respect to the docking connector 50 as a fulcrum point when the personal computer 12 is docked to the docking unit 10.

Next, the effect and advantage of the docking unit 10 are described. The personal computer 12 is docked to the docking unit 10. At the docking of the personal computer 12, the extended connector 28 of the personal computer 12 is set on the docking connector 50 of the docking unit 10 and then the personal computer 12 is pressed down.

After that, for example, a cover of the extended connector 28 is opened, and the extended connector 28 is thereby exposed and connected to the docking connector 50. In addition, the L-shaped ends of the locking members 70 engage with the engagement portions of the personal computer 12. In this manner, the personal computer 12 and the docking unit 10 are electrically connected via the extended connector 28 and the docking connector 50 and mechanically connected.

For example, it is assumed that the side of the main unit 20 is heavier than the side of the display unit 22 with respect to the docking connector 50 as a fulcrum point of the personal computer 12. If the personal computer 12 is docked to the docking unit 10 in this case, the front side (near side) of the main unit 20 moves down and touches the desk 99 on which the personal computer 12 is placed. Therefore, the user can operate the input unit 26 in stable condition when the personal computer 12 is docked to the docking unit 10.

In contrast, it is assumed that the side of the display unit 22 is heavier than the side of the main unit 20 with respect to the docking connector 50 as a fulcrum point of the personal computer 12.

Figure 11:
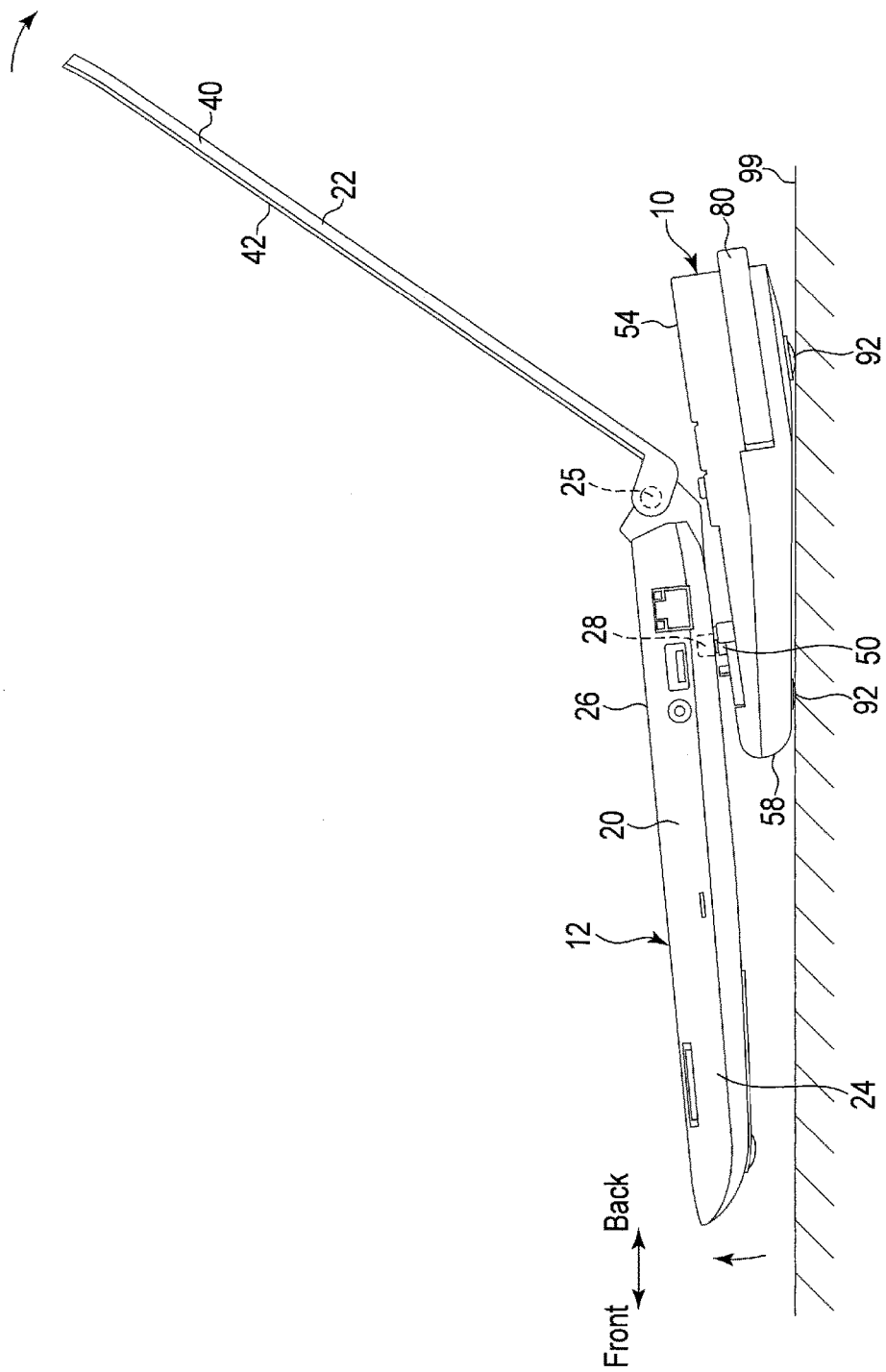
FIG. 11 is a side view showing a comparative example.

If the personal computer 12 is docked to the docking unit 10 in this case, the personal computer 12 leans toward the side of the display unit 22 and the front side of the main unit 20 is lifted from the desk 99, as shown in FIG. 11. The user cannot operate the input unit 26 in stable condition if the main unit 20 is lifted from the desk 99.

In such a case, the biasing member 14 is fitted into the groove portion 74 of the docking unit 10 before docking the personal computer 12 to the docking unit 10. The biasing member 14 is fitted into the groove portion 74 with the pressing members 18 facing upward. Since the housing 16 of the biasing member 14 substantially corresponds to the shape of the groove portion 74, the biasing member 14 engages with the groove portion 74 almost without play.

At this time, the top plate 100 of the biasing member 14 and the top plate 54 of the docking unit 10 are substantially the same in height. Accordingly, the pressing members 18 protrude from the same height as the top plate 54 of the docking unit 10.

Then, the personal computer 12 is docked to the docking unit 10 as described above. The personal computer 12 is attached on the docking unit 10 while the extended connector 28 and the docking connector 50 are connected. When the personal computer 12 is attached to the docking unit 10, the personal computer 12 presses down the pressing members 18 against the force of the springs 36.

As a result, the personal computer 12 is subjected to resilience of the springs 36 from the pressing members 18. Since the resilience from the pressing members 18 is sufficiently stronger than the force leaning the personal computer 12 backward, the personal computer 12 is biased with respect to the docking connector 50 as a fulcrum point such that the front side of the main unit 20 is moved down to the desk 99.

The personal computer 12 is thereby in a state shown in FIG. 4, i.e., the front side of the main unit 20 touches the desk 99 and the main unit 20 is supported by the desk 99 and the top surface of the docking unit 10. Therefore, the user can operate the input unit 26 in stable condition when the personal computer 12 is connected to the docking unit 10.

Figure 10:
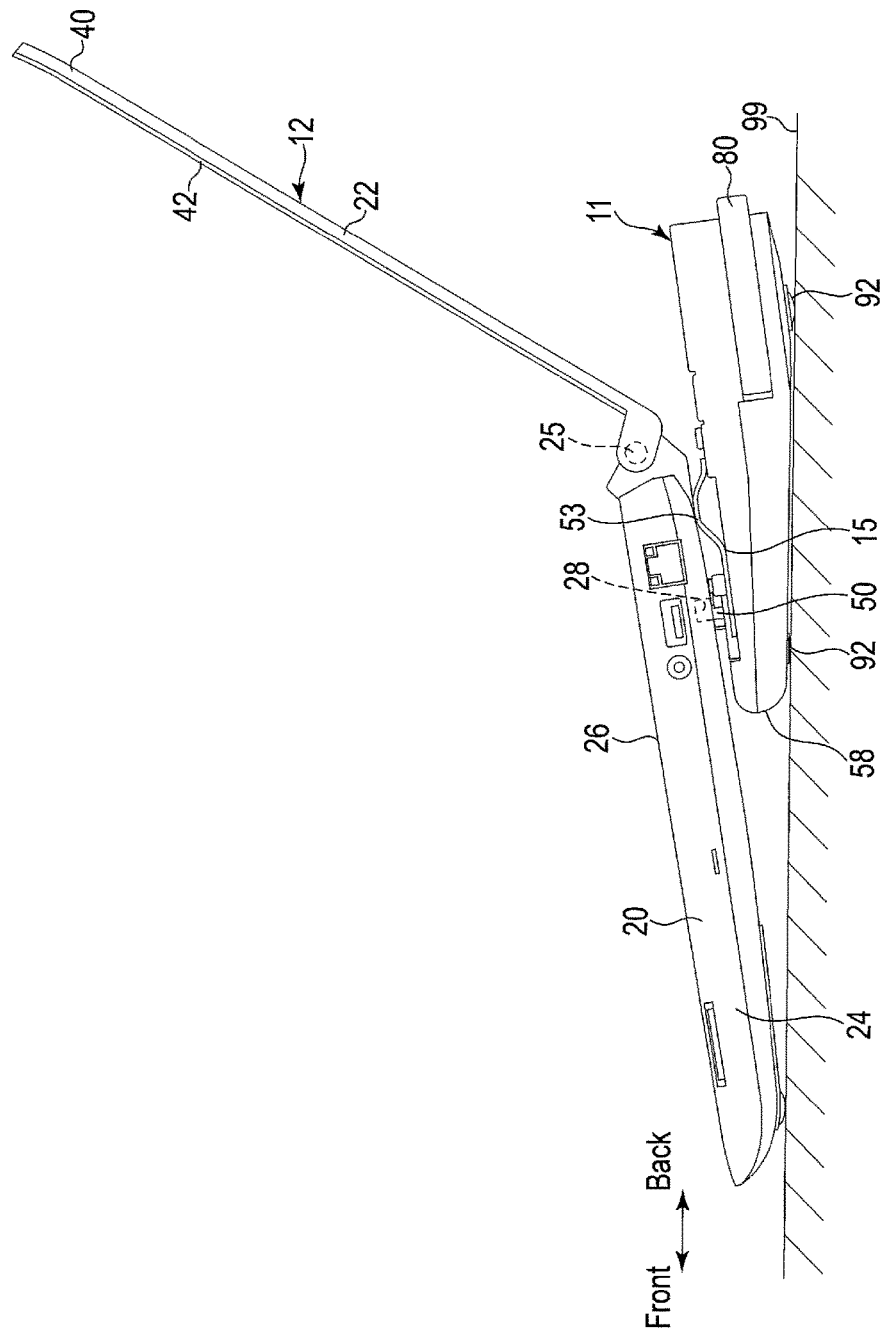
FIG. 10 is a side view showing a state where a personal computer is attached to the docking unit.

Next, the second embodiment is described. A docking unit 11 of the second embodiment is shown in FIG. 9 and FIG. 10. The docking unit 11 is the same as the docking unit 10 except that the groove portion is not provided. The same members as those of the docking unit 10 are represented by the same reference signs and their description is omitted.

A biasing member 15 is attached to the docking connector 50 of the docking unit 11. The biasing member 15 is formed of an elastic material having predetermined elasticity. The biasing member 15 has a shape of a thin plate and comprises a mounting hole 51 into which the docking connector 50 is inserted and curved portions 53.

The mounting hole 51 has a size so as to enclose the docking connector 50 and its surrounding elements such as the locking members 70. The mounting hole 51 is formed such that the biasing member 15 is supported by the docking connector 50 without detaching from the docking unit 11 when the docking connector 50 is inserted into the mounting hole 51.

The curved portions 53 are formed such that the biasing member 15 is curved to protrude upward from the top plate 54 substantially like arches between the front end and the back end of the curved portions 53 when the biasing member 15 is placed on the docking unit 11. The curved portions 53 have sufficient elasticity to move the personal computer 12 using the docking connector 50 as a fulcrum point.

The biasing member 15 is used when the docking unit 11 is docked to the personal computer 12, the personal computer 12 leans backward and the front side of the personal computer 12 is lifted.

The biasing member 15 is attached to the docking unit 11 by inserting the docking connector 50 into the mounting hole 51. The personal computer 12 is docked to the docking unit 11 after attaching the biasing member 15 to the docking unit 11.

As a result, as shown in FIG. 10, the curved portions 53 of the biasing member 15 bias the bottom surface of the personal computer 12 upward and move the personal computer 12 such that the front side of the personal computer 12 is lowered. The front side of the personal computer 12 thereby touches the desk 99, which makes the personal computer 12 stable.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A docking unit comprising:
a placement surface which slopes down to a front side of the docking unit and configured to receive an electronic device;
a docking connector on the placement surface and configured to connect to an extended connector of the electronic device;
a groove portion recessed under the placement surface and located behind the docking connector;
a biasing member detachably fitted into the groove portion; and
a pressing member on a top surface of the biasing member configured to protrude upward from the top surface and to retract downward into the top surface by first resilience.

2. The docking unit of claim 1, wherein
the biasing member comprises:
a housing having an external shape corresponding to an internal shape of the groove portion; and
a spring biasing the pressing member such that the pressing member protrudes from a top plate of the housing,
wherein the pressing member has a shape of a covered cylinder and penetrates the top plate configured to protrude from and to retract into the top plate.

3. The docking unit of claim 2, wherein
the pressing member touches a bottom surface of the electronic device placed on the placement surface and moves the electronic device such that a front side of the electronic device is lowered by exerting resilience of the spring and using the docking connector as a fulcrum point.

4. The docking unit of claim 1, wherein
the electronic device is a personal computer comprising a main unit and a display unit rotatably attached to a back end of the main unit.

5. The docking unit of claim 2, wherein
the electronic device is a personal computer comprising a main unit and a display unit rotatably attached to a back end of the main unit.

6. The docking unit of claim 3, wherein
the electronic device is a personal computer comprising a main unit and a display unit rotatably attached to a back end of the main unit.

7. The docking unit of claim 4, wherein
the groove portion has a shape corresponding to an external shape of a battery pack attached to the main unit of the personal computer.

8. The docking unit of claim 5, wherein
the groove portion has a shape corresponding to an external shape of a battery pack attached to the main unit of the personal computer.

9. The docking unit of claim 6, wherein
the groove portion has a shape corresponding to an external shape of a battery pack attached to the main unit of the personal computer.

* * * * *